United States Patent Office 3,705,210
Patented Dec. 5, 1972

3,705,210
CROSS-LINKABLE COMPOSITIONS BASED ON VINYL CHLORIDE CROSS LINKABLE COPOLYMERS AND ELASTOMERS
Alexis Mathieu, Brussels, Belgium, and Claude Barberot, Paris, France, assignors to Solvay & Cie, Brussels, Belgium
No Drawing. Filed Jan. 29, 1970, Ser. No. 6,935
Claims priority, application France, Feb. 4, 1969, 6902422
The portion of the term of the patent subsequent to Feb. 22, 1989, has been disclaimed
Int. Cl. C08f 29/24, 37/18
U.S. Cl. 260—876 R
16 Claims

ABSTRACT OF THE DISCLOSURE

The cross-linkable composition contains from about 1 to 18% by weight of one or more elastomers and 99 to 82% by weight of a cross-linkable vinyl polymer based on vinyl chloride. The cross-linkable vinyl polymer is obtained by polymerization of 3 to 50 parts by weight of a mixture of a diolefin and one or more monomers chosen from the nitriles and esters of unsaturated monocarboxylic acid and unsaturated polycarboxylic acid, in the presence of 100 parts by weight of a copolymer of vinyl chloride and a moonmer containing at least 8 carbon atoms and which is a vinyl ester of a monocarboxylic acid, an ester of an unsaturated mono- or polycarboxylic acid or an alkyl vinyl ether. The cross-linkable composition has excellent elasticity and processability at low temperature and is cross-linked rapidly and completely to produce semi-rigid products which have good dielectric properties and excellent mechanical properties.

BACKGROUND OF THE INVENTION

The present invention relates to new cross-linkable plastic compositions based on vinyl chloride copolymers and elastomers. The invention also concerns semi-rigid cross-linked plastic compositions based on vinyl chloride copolymers, which may be used for insulation, particularly for insulating envelopes or sheets which are employed to protect electric cables.

Cross-linkable vinyl chloride copolymers which have been disclosed in copending U.S. patent application Ser. No. 659,849 filed on Aug. 11, 1967, have a variety of excellent characteristics and these new compositions have enabled the use of polymers based on vinyl chloride, to be broadened considerably more especially in the field of cable manufacture. Such cross-linkable, internally plasticized vinyl chloride copolymer compositions are obtained by polymerization 3 to 50 parts by weight and preferably 5 to 25 parts by weight of a mixture of a diolefin and at least one monomer of the group consisting of nitriles and esters of unsaturated mono- or polycarboxylic acids in the presence of 100 parts by weight of a copolymer of vinyl chloride with a monomer containing at least 8 carbon atoms and selected from the group consisting of vinyl esters of monocarboxylic acids, esters of unsaturated mono- or polycarboxylic acids and alkyl-vinyl ethers.

However, these cross-linkable copolymers have a poor resistance to cold and a resistance to heat-creeping insufficient to permit their use for cables which are subject to severe conditions.

In copending patent application Ser. No. 819,988 filed on Apr. 28, 1969, now U.S. Pat. No. 3,644,578, rubbery compositions of 95 to about 20% by weight of elastomer and 5 to 80% by weight of the above described vinyl chloride based cross-linkable copolymer are disclosed. These cross-linkable compositions, which contain about 20% or more of elastomer are rubbery materials and may be used in applications where rubbery elastomers are usually employed. However, they cannot be used for certain applications such as semi-rigid insulation which requires a less elastic or less rubbery material having a superior hardness but which also has sufficient elasticity at low temperatures.

SUMMARY OF THE INVENTION

It has been found that the combination of a small amount of a compatible elastomer and vinyl chloride based cross-linkable copolymer composition yields a composition of substantially improved processability. By means of the present compositions, the desired degree of cross-linking is more easily obtained, the required mechanical characteristics are more readily attained and the elasticity at low temperatures is desirably increased. In other respects, the excellent general characteristics of the vinyl chloride cross-linkable copolymers are preserved.

According to the present invention, the cross-linkable plastic compositions comprise a vinyl chloride cross-linkable copolymer in an amount of less than 20% by weight generally about 1% to about 18% by weight and one or more elastomers or synthetic rubbers in an amount of about 99% to about 82% by weight. The vinyl chloride cross-linkable copolymer is obtained by polymerizing 3 to 50 parts by weight of a mixture of a diolefin and one or more monomers selected from the nitriles and the esters of unsaturated mono- or polycarboxylic acids in the presence of 100 weight parts of a copolymer of vinyl chloride and a monomer having at least 8 carbon atoms selected in the group consisting of the vinyl esters of monocarboxylic acids, the esters of unsaturated mono- or polycarboxylic acids and the alkyl vinyl ethers.

The present cross-linkable compositions are readily cross-linked to form semi-rigid products which have excellent mechanical properties including resistance to chemicals, resistance to abrasion and excellent thermal stability and good dielectric properties. The semi-rigid cross-linked products and method of preparation thereof also form part of the present invention.

DESCRIPTION OF THE INVENTION

The vinyl chloride cross-linkable copolymers used in the present invention are those described in copending U.S. patent application 659,849, now U.S. Pat. No. 3,544,-661. These cross-linkable copolymers are obtained by first preparing a suitable internally plasticized vinyl chloride copolymer and then modifying this copolymer to yield a cross-linkable composition.

To prepare the internally plasticized vinyl chloride used for the present cross-linkable copolymers, vinyl chloride is copolymerized with a monomer containing at least 8 carbon atoms. These monomers may be vinyl esters of monocarboxylic acids containing at least 6 carbon atoms and preferably more than 10 carbon atoms in the acid radical, such as vinyl laurate, palmitate and stearate; esters of unsaturated mono- or polycarboxylic acids, especially alkyl maleates, fumarates, acrylates and methacrylates and even more preferably those having an alkyl chain of 6 to 12 carbon atoms such as octyl fumarate and maleate and ethylhexyl acrylate, and alkylvinyl ethers, preferably those in which the alkyl chain has 12 to 18 carbon atoms and most preferably cetyl-vinyl ether.

The weight ratio of the vinyl chloride to the plasticizing comonomer is preferably in the range of 95:5 to 75:25.

The copolymerization involved is a conventional addition polymerization and, accordingly, can be effected by any known means. It is preferred, however, to conduct the copolymerization in an aqueous suspension at a temperature of from 40 to 70° C. in the presence of an initiator soluble in the monomers. Preferred initiators are organic peroxides, particularly lauroyl peroxide, 2,4-dichlorobenzoyl peroxide, and acetylcyclohexanesulfonyl peroxide as well as the peroxydicarbonates.

As usual in addition polymerization in aqueous suspension, a dispersing agent is employed. In this case, the dispersing agent is preferably one which favors porosity of the vinyl chloride copolymers being formed. Examples of such dispersing agents are copolymers of vinylpyrrolidone with an alkyl acrylate, the alkyl group of which contains at least 6 carbon atoms, mixtures of polyvinyl alcohol and one or more products resulting from the condensation of a polyoxyalkylene glycol with a polyamine, partially esterified styrene-maleic anhydride copolymers as well as polyvinyl alcohols with a low degree of hydrolysis.

The resultant vinyl chloride copolymer is then modified by the polymerization of a mixture of a diolefin and one or more monomers of the group consisting of nitriles and esters of unsaturated mono- or polycarboxylic acids in the presence of the vinyl chloride copolymer. The diolefin is preferably butadiene, dichlorobutadiene or isoprene. The other monomer or monomers are preferably acrylonitrile, fumaronitrile, methacrylonitrile or lower alkyl acrylates or methacrylates in which the alkyl group contains from 1 to 4 carbon atoms.

The amount of the mixture of the modifying monomers employed is from 3 to 50 parts by weight and preferably from 5 to 25 parts by weight per 100 parts by weight of the vinyl chloride copolymer. The proportion of the diolefin in the mixture of modifying monomers is from 10 to 99%.

The procedure used for the polymerization of the modifying monomers in the presence of the copolymer with internal plasticization is not of primary importance for obtaining the cross-linking copolymer of vinyl chloride employed in the present invention. The method used may be a suspension, an emulsion or a bulk polymerization process.

In general, the elastomer used in the present compositions is a synthetic rubber having a Mooney ML (1+8) min. viscosity at 100° C. comprised between 40 and 140 (Test ASTM D 927/53T). Among the synthetic rubbers which may be employed the following are particularly useful:

Olefin polymers such as butyl rubber, ethylene-vinyl acetate copolymers, especially those containing 15 to 85% by weight of vinyl acetate, ethylene copolymers and terpolymers, such as ethylene-propylene copolymers and ethylene-propylene conjugated and non-conjugated diene terpolymers, preferably those having a Mooney ML (1+8) viscosity at 100° C. comprised between 40 and 90 (Test ASTM D 927/53T) and a content of propylene comprised between 15 and 45 mole percent. Olefin copolymers modified by unsaturated products, i.e., terpolymers are for example, terpolymers of ethylene, propylene and hexadiene 1,4,5-methylene-norbornene-2 and dicyclopentadiene.

Halogenated polyethylenes such as chlorinated and sulfochlorinated polyethylenes.

Diolefin polymers and copolymers, preferably having a Mooney ML (1+8) viscosity at 100° C. comprised between 40 and 80, such polymers of conjugated diolefins include for example polybutadiene, polyisoprene, butadiene-styrene copolymers, and butadiene-acrylonitrile copolymers.

The non-conjugated dienes combined with ethylene and propylene in the above mentioned terpolymers are preferentially chosen from among the following groups:

The non-conjugated aliphatic dienes such as pentadiene-1,4, hexadiene-1,4 and hexadiene-1,5;

The non-conjugated monocyclic dienes such as 4-vinylcyclohexene, 1,3-divinylcyclohexene, cycloheptadiene-1,4 and cyclooctadiene-1,5;

The non-conjugated alicyclic dienes possessing an endocyclic bridge such as dicyclopentadiene, norbornadiene, methylene norbornene, ethylidene norbornene and tetrahydroindene.

The chlorinated polyethylenes which may be used to carry out the invention are those which are produced by chlorination of high or low density polyethylenes and which contain preferably 20 to 50% of chlorine. The method of manufacture of the chlorinated polyethylenes is of little importance providing the obtained products have the characteristics of elastomers and particularly a Mooney viscosity between 40 and 140 as previously mentioned. Other types of elastomers i.e. polyepichlorohydrin, sicilone rubber, polyepithioalkane rubber and the like synthetic rubbers having the required Mooney viscosity may also be used.

The compositions according to the invention may also include variable proportions of other ingredients selected in order to achieve the characteristics required for the various applications, and more specifically plastifiers, various stabilizers, lubricants, charges, pigments, dyes and fungicides.

A plastifier may be used in an amount of about 30 to 70% by weight based on the weight of the polymer.

The plasticizers incorporated in the compositions prepared according to the present invention are preferentially selected from the following groups:

Phthalic esters such as the octyl phthalates, di-2-ethylhexyl- and isooctyl phthalates and didecil phthalate;

Phosphoric esters, such as triaryl, trialkyl and arylalkyl phosphates;

Chlorinates aliphatic and aromatic compounds such as chlorinated paraffins and chlorinated diphenyls;

The simple or mixed esters of adipic, azaleic, citric, sebacic acid, such as octyl adipate and octyl sebacate; and The macromolecular plasticizers such as the linear polyesters.

Used preferentially are the compounds having a low volatility, called "high-temperature plasticizers," and particularly the trimellitates, the esters of pentaerythritol, and di-tridecyl phthalate.

The stabilizers added to the compositions according to the invention may be:

Metallic salts such as salts of sodium, calcium, basic lead and preferably the silicates, carbonates, phthalates and phosphites, The metallic derivatives of fatty acids such as fatty acid salts of lead, cadmium, barium, strontium and tin, The epoxidized vegetable oils, and the antioxidants such as the mono- and polyphenols.

Such stabilizers may be used in the present composition in amounts of about 3 to 10% by weight based on the weight of the polymer.

Reinforcing and other inert materials such as carbon black, zinc dioxide, chalk, kaolin, talc, etc. may also be incorporated in the composition of the present invention in amounts of about 4 to 7% by weight based on the weight of the polymer.

Aliphatic, naphthenic and aromatic mineral oils in amounts of about 0.2 to 2% by weight may likewise be included in the present compositions. The additives are added to the compositions of the invention before the cross-linking process.

The processing of the compositions according to the invention may be carried out by any suitable means known in the art, for instance by malaxing in an internal malaxer or a cylinder malaxer.

The processing temperature of the compositions according to the invention is preferably between 80° and 120° C.

The present compositions are cross-linkable by means of an organic peroxide on systems including an organic peroxide and polyfunctional agents.

In general, the organic peroxides which may be used are all those having a decomposition temperature superior to 130° C. and more specifically dicumyl peroxide, 2,5-dimiethyl-2,5-di(tertio-butyl-peroxy)-hexane, 2,5-dimethyl-2,5-di-tertio-butyl-peroxy) - hexane, di-terio-butyl peroxide, di-tertio-butyl hydroperoxide and the α,α'-di(tertio-butyl-peroxy) diisopropyl-benzene.

By polyfunctional agent is meant the cross-linking coagents as described, for instance, in Industrial & Engineering Chemistry, vol. 2, No. 3, September 1963 (p. 202) and Revue de l'Institut Francais du Petrole 1967, April, p. 675, Table XV, which are incorporated herein by reference.

The systems including organic peroxides and polyfunctional agents comprise the above-mentioned organic peroxides combined with one or several polyfunctional agents among which, triallyl cyanurate, diallyl phthalate, divinylbenzene, tetraallyloxyethane, etc. are used preferably.

Preferably, 0.5 to 10 g. of cross-linking system per 100 g. of polymer are used.

The cross-linking system is incorporated in the polymer by malaxing at a temperature inferior to the temperature of decomposition of the peroxide used.

The compositions according to the invention have excellent characteristics. Among the most exceptional characteristics may be pointed out excellent elesticity at low temperatures, fast and complete cross-linking and easy processing at low temperatures. With respect to elasticity at low temperature, the value of the present compositions is below $-15°$ C. (norm UTE NF C 32200).

In other respects, the products according to the invention have good dielectric properties, excellent resistance to chemicals, particularly oil, and to abrasion and excellent thermal stability. The products of the present invention, particularly those containing chlorinated polyethylene, have a variation of elongation at break inferior to 15% (24 hours at 70° C.) and 40% (24 hours at 100° C.)

The above mentioned characteristics and the low cost of the compositions according to the invention indicate that they are exceptionally useful materials for many applications.

The following examples which are included to illustrate the best mode currently contemplated for carrying out the present invention must not be considered as limiting the invention in any manner. Examples referred to by the letter R do not illustrate the invention and have been included for purposes of comparison.

EXAMPLES 1 TO 4

Various mixtures containing 15 parts of elastomers and 100 parts of a cross-linkable vinyl chloride copolymer obtained by polymerizing butadiene and methyl methacrylate in the presence of a vinyl stearate-vinyl chloride copolymer according to the technique described hereafter are prepared by malaxing.

Distilled water, in an amount of 2,500 g., 4 g. of polyvinyl alcohol, 4 g. of lauroyl peroxide and 200 g. of vinyl stearate are introduced in a 5 liter autoclave.

The autoclave is emptied by means of a vacuum pump in order to eliminate the most important part of the oxygen.

Vinyl chloride in an amount of 800 g. are added and the temperature inside the autoclave is raised to 60° C. as the reactants are stirred at constant speed.

After 12 hours of reaction, the conversion rate of the monomers is about 90%. After releasing the unreacted monomers, 50 g. of methyl methacrylate, 50 g. of butadiene and 2 g. of lauroyl peroxide are introduced.

The temperature is raised to 80° C. and the polymerization is continued for 2 hours.

The thus produced polymer is washed and dried in a ventilated oven at 50° C. until the weight remains constant.

The various elastomers incorporated in the vinyl chloride cross-linkable polymer are:

A butadiene-acrylonitrile copolymer comprising 33 weight percent of acrylonitrile sold under the name Perbunan 3307 (Bayer).

A chlorinated polyethylene sold under the name Plaskon CPE 500 (Allied Chem.) which is manufactured by chlorinating high density polyethylene and which contains 40% by weight of chlorine, has a Mooney viscosity at 100° C. (ASTM D 927/53T) of 90±10 and a specific weight of 1.19.

A sulfochlorinated polyethylene sold under the name Hypalon 40 (Du Pont) which contains 34.5% by weight of chlorine and 0.9% by weight of sulfur, a Mooney viscosity at 100° C. (ASTM D 927/53T) of 40±5 and a specific weight of 1.18; Hypalon 40 HV which is also a sulfochlorinated polyethylene, having the same chlorine and sulfur content as Hypalon 40 but a Mooney viscosity of 115±15 can be used in place of Hypalon 40.

For the sake of comparison, a mixture free of elastomer has been used in the same conditions (Example R1).

After the ingredients mentioned in the following Table 1 have been added, the compositions are cross-linked by means of a system consisting of an organic peroxide and triallyl cyanurate.

The following characteristics are determined on the recovered products:

Break strain and elongation according to norm ASTM D 412.

Resistance to compression at 200° C. according to the following method: In a 1 cm.$^2$ surface of a plate having a thickness of about 2 mm., a 5 kg. load is applied at 200° C. for 5 minutes; the deformation ratio (compression) is measured afterwards; it should be equal or inferior to 40%; 10 minutes after the test, the residual deformation is measured providing an estimate of the elastic recovery of the material.

Elasticity at low temperature according to the test conditions specified in paragraph 3-3-4-5 of norm UTE NF C 32,200.

TABLE 1

| Example | R₁ | 2 | 3 | 4 |
|---|---|---|---|---|
| Composition, g.: | | | | |
| Vinyl chloride cross-linkable copolymer | 100 | | | |
| Butadiene-acrylonitrile copolymer (Perbunan 3307) | | 15 | | |
| Sulfochlorinated polyethylene (Hypalon 40) | | | 15 | |
| Chlorinated polyethylene (Plaskon CPE 500) | | | | 15 |
| Dibasic lead phthalate | 7 | | | |
| Dioctyl phthalate | 30 | | | |
| Kaolin | 20 | | | |
| α,α'-Bis(t-butyl peroxy)-p-diisopropylbenzene (Peroxymon F 40) | 4 | | | |
| Triallyl cyanurate | 3 | | | |
| Characteristics: | | | | |
| Break strain, kg./cm.² | 210 | 200 | 175 | 175 |
| Break elongation, percent | 220 | 250 | 220 | 225 |
| Deformation, percent | 35 | 40 | 38 | 26 |
| Deformation after 10 minutes, percent | 2 | 7 | 5 | 3 |
| Elasticity at low temperature, °C | −15 | −20 | −20 | −25 |

The above test results show, particularly when compared with the comparative example R₁ a significant improvement of the brittleness at low temperature, the excellent mechanical properties of the basic polymer being preserved and even improved in certain cases. The compositions are also easier to process.

EXAMPLES 5 AND 6

A mixture is prepared by malaxing 10 parts of a butadiene-acrylonitrile copolymer containing 33% of acrylonitrile sold under the name of Perbunan 3307 (Bayer) and 90 parts of a vinyl chloride cross-linkable copolymer prepared by polymerizing butadiene and methyl methacrylate in the presence of a vinyl chloride-vinyl stearate copolymer according to the technique and in the same proportions as in Examples 1 to 4.

For the sake of comparison, the results obtained with a composition containing no elastomer have been recorded in Example R5.

After the ingredients as set forth in Table 2 have been added, the compositions are cross-linked by means of system consisting of an organic peroxide and triallyl cyanurate.

The following properties have been measured afterwards:

Break elongation according to norm ASTM D412.

Resistance to oils according to the following method: the samples are immersed at 100° C. during 24 hours (section 26 of norm UTE NF C 32,100); the percentage of variation of the elongation break is measured afterwards.

Elasticity at low temperature according to paragraph 3-3-4-5 of norm UTE NF C 32,200.

TABLE 2

| Example | R₅ | 6 |
|---|---|---|
| Composition, g.: | | |
| Vinyl chloride cross-linkable copolymer | 100 | 90 |
| Butadiene-acrylonitrile copolymer (Perbunan 3307) | | 10 |
| Dioctyl phthalate | 30 | |
| Dibasic lead phthalate | 7 | |
| Kaolin | 20 | |
| α,α'-Bis(t-butyl peroxy)-p-diisopropylbenzene (Peroxymon F 40) | 3 | |
| Triallyl cyanurate | 3.5 | |
| Characteristics: | | |
| Break elongation, percent | 220 | 240 |
| Variation of the break elongation after the oil test, percent | 50 | 29 |
| Elasticity at low temperature, °C | −15 | −20 |

The test results in Table 2 show an improvement of the elasticity at low temperature and consequently less brittleness at low temperature, a substantial increase of the break elongation and of the ability to withstand oils.

EXAMPLES 7 AND 8

Mixtures are prepared by malaxing 18 parts of chlorinated polyethylenes containing respectively 27 and 43% of chlorine sold under the name Haloflex AG 227 and 243 obtained by chlorinating low density polyethylene with the vinyl chloride cross-linkable copolymer described in Examples 1 to 4.

The following characteristics are determined with respect to the resulting cross-linked compositions:

Break strain and elongation and according to norm ASTM D 412

Elasticity at low temperature according to test conditions of Paragraph 3-3-4-5 of norm UTE NF C 32,200

Resistance to oils according to the conditions described in Section 26 of norm UTE NF C 32,100; the percentage of variation of the break elongation is measured.

The results of these tests are set forth in Table 3.

TABLE 3

| Example | 7 | 8 |
|---|---|---|
| Vinyl chloride cross-linkable copolymer | 82 | 82 |
| Chlorinated polyethylene containing 27% of chlorine (Haloflex AG 227) | 18 | |
| Chlorinated polyethylene containing 43% of chlorine (Haloflex AG 243) | | 18 |
| Break strain, kg./cm.² | 200 | 206 |
| Break elongation, percent | 210 | 208 |
| Residual deformation after 10 minutes, percent | −5 | −1 |
| Elasticity at low temperature, °C | −20 | −20 |
| Variation of the break elongation after the oil test, percent | 10 | 5-8 |

The excellent mechanical properties of the compositions are illustrated as well as an improvement of the elasticity at low temperature compared with the comparative Example R₁.

In other respects, the ability to withstand oils is also improved. These results show the importance of the chlorine content of the chlorinated polyethylene and consequently the necessity to choose a formulation adjusted to the particular quality desired.

What we claim and desire to secure by Letters Patent is:

1. Plastic cross-linkable composition comprising a vinyl chloride cross-linkable copolymer and at least one elastomer selected from the group consisting of butadiene/acrylonitrile copolymers, chlorinated and sulfochlorinated polyethylenes containing from 20 to 50% of chlorine having a Mooney viscosity at 100° C. of about 40 to 140 as determined by ASTM test D 927/53T and ethylene/propylene copolymers, ethylene/propylene/conjugated diene terpolymers and ethylene/propylene/non-conjugated diene terpolymers having a Mooney ML(1+8) viscosity at 100° C. of about 40 to 90 as determined by ASTM test D 927/53T and a propylene content of 15 to 45 mole percent, in a proportion by weight of about 1 to 18% of said elastomer and about 99 to 82% of said vinyl chloride cross-linkable copolymer, said vinyl chloride copolymer being prepared by polymerizing 3 to 50 parts by weight of a mixture of a conjugated diolefin and at least one monomer selected from the group consisting of a nitrile and an ester of an unsaturated monocarboxylic acid and an unsaturated polycarboxylic acid in the presence of 100 parts by weight of a copolymer of vinyl chloride and a plasticizing monomer containing at least 8 carbon atoms selected from the group consisting of a vinyl ester of monocarboxylic acids, an ester of an unsaturated monocarboxylic acid or polycarboxylic acid and an alkyl vinyl ether.

2. Plastic cross-linkable composition in accordance with claim 1 in which the elastomer is selected from ethylene/propylene copolymers, ethylene/propylene/conjugated diene terpolymer and ethylene/propylene/non-conjugated diene terpolymer having a Mooney ML (1+8) viscosity at 100° C. of 40 to 90 according to ASTM D 297/53T and a propylene content of 15 to 45 mole percent.

3. Plastic cross-linkable composition according to claim 1, in which the elastomer is a butadiene-acrylonitrile copolymer.

4. Plastic cross-linkable composition according to claim 1, in which the elastomer is a chlorinated polyethylene containing from 20 to 50% of chlorine.

5. Plastic cross-linkable composition according to claim 1, in which the elastomer is a sulfochlorinated polyethylene containing from 20 to 50% of chlorine.

6. Plastic cross-linkable composition according to claim 1, in which the cross-linkable copolymer is prepared by polymerizing the modifying monomers in the presence of a vinyl chloride copolymer according to a suspension process.

7. Plastic cross-linkable composition according to claim 1, in which the diolefin used for the preparation of the cross-linkable copolymer is selected from the group which consists of butadiene, 2-chlorobutadiene and isoprene.

8. Plastic cross-linkable composition according to claim 1, in which a nitrile of unsaturated monocarboxylic or polycarboxylic acids used for the preparation of the cross-linkable copolymer is selected from the group consisting of acrylonitrile, fumaronitrile and methacrylonitrile.

9. Plastic cross-linkable composition according to claim 1, in which the ester of an unsaturated monocarboxylic or polycarboxylic acid used in combination with the diolefin during the preparation of the cross-linkable copolymer is selected from at least one member of the group consisting of lower alkyl esters of acrylic acid and methacrylic acid wherein the alkyl group contains 1 to 4 carbon atoms.

10. Plastic cross-linkable composition according to claim 1, in which the vinyl ester of a monocarboxylic acid containing at least 8 carbon atoms which are polymerized with vinyl chloride during the preparation of the vinyl chloride cross-linkable copolymer is selected from at least one member of the group consisting of vinyl laurate, vinyl palmitate and vinyl stearate.

11. Plastic cross-linkable composition according to claim 1, in which the ester of an unsaturated monocarboxylic and polycarboxylic acid which is copolymerized with vinyl chloride to prepare the cross-linkable copolymer is selected from at least one member of the group which consists of alkyl maleate, fumarate, acrylate and methacrylate wherein the alkyl group contains 6 to 12 carbon atoms.

12. As a new industrial product, an article comprised of the composition defined in claim 1 which has been subjected to a cross-linking treatment.

13. As a new industrial product, an article comprised of the composition defined in claim 1 cross-linked by means of at least one organic peroxide.

14. As a new industrial product, an aritcle comprised of the composition defined in claim 1 which has been cross-linked by means of a combination of at least one organic peroxide and at least one polyfunctional agent.

15. As a new industrial product, a shaped product comprised of a composition defined in claim 1 which has been cross-linked.

16. As a new industrial product, an insulation protection for electric cables, comprised of a composition defined in claim 1 which has been cross-linked.

References Cited

UNITED STATES PATENTS

| 3,085,082 | 4/1963 | Baer et al. | 260—876 |
| 3,281,345 | 10/1966 | Kuhne | 260—876 |
| 3,475,361 | 10/1969 | Garner | 260—876 |

FOREIGN PATENTS

| 1,496,772 | 8/1967 | France | 260—879 |
| 932,852 | 7/1963 | Great Britain | 260—876 |
| 1,093,974 | 12/1967 | Great Britain | 260—879 |

SAMUEL H. BLECH, Primary Examiner

H. W. ROBERTS, Assistant Examiner

U.S. Cl. X.R.

260—23.7 H, 30.6 R, 31.6, 31.8 N, 33.6 UA, 33.8 UA, 41.5 R, 45.7 PR, 45.75 R, 45.85, 45.9 R, 45.95, 827 879